(12) United States Patent
Iwami et al.

(10) Patent No.: US 8,804,150 B2
(45) Date of Patent: Aug. 12, 2014

(54) IMAGE FORMING APPARATUS WITH PLURALITY OF OPTICAL SCANNING DEVICES

(71) Applicant: KYOCERA Document Solutions Inc., Osaka (JP)

(72) Inventors: Naoki Iwami, Osaka (JP); Hiroshi Yamashita, Osaka (JP); Ryota Maeda, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/775,347

(22) Filed: Feb. 25, 2013

(65) Prior Publication Data

US 2013/0222870 A1 Aug. 29, 2013

(30) Foreign Application Priority Data

Feb. 27, 2012 (JP) ................................ 2012-040259

(51) Int. Cl.
*G06F 3/12* (2006.01)

(52) U.S. Cl.
USPC ............. 358/1.13; 358/2.1; 358/504; 399/44; 399/85; 399/94; 359/206.1; 359/877; 347/261; 347/134; 347/137; 347/17

(58) Field of Classification Search
USPC ......... 358/1.9, 2.1, 1.13, 504; 399/44, 85, 94, 399/4; 359/206.1, 877; 347/261, 128, 134, 347/137, 194, 17
See application file for complete search history.

(56) References Cited

U.S. PATENT DOCUMENTS

| | | | |
|---|---|---|---|
| 2008/0056742 A1* | 3/2008 | Hattori et al. | 399/44 |
| 2008/0068678 A1* | 3/2008 | Suzuki et al. | 358/481 |

FOREIGN PATENT DOCUMENTS

| | | |
|---|---|---|
| JP | 2000-214655 | 8/2000 |
| JP | 2007-83514 | 4/2007 |

* cited by examiner

*Primary Examiner* — Jamares Q Washington
(74) *Attorney, Agent, or Firm* — Gerald E. Hespos; Michael J. Porco; Matthew T. Hespos (57) ABSTRACT

An image forming apparatus includes a plurality of optical scanning devices, a job receiver, a job executor, an image discriminator, a temperature condition judger and a temperature adjuster. When a formation-target image is a single-color image and an image to be formed next is a multi-color image, the temperature adjuster drives a motor of one optical scanning device at a second rotating speed slower than a rotating speed during an image forming operation and drives motors of unused optical scanning devices at a third rotating speed faster than the second rotating speed if a temperature condition is satisfied upon the completion of an image forming operation of the single-color image.

4 Claims, 7 Drawing Sheets

IMAGE FORMING APPARATUS WITH PLURALITY OF OPTICAL SCANNING DEVICES

INCORPORATION BY REFERENCE

This application is based on Japanese Patent Application Serial No. 2012-40259 filed with the Japan Patent Office on Feb. 27, 2012, the contents of which are hereby incorporated by reference.

BACKGROUND

The present disclosure relates to an image forming apparatus with a plurality of optical scanning devices and particularly to a technology for suppressing a scan position shift which occurs due to a temperature difference between optical scanning devices.

Conventionally, an image forming apparatus has been known which includes an image forming unit configured to form a toner image on a surface of a photoconductive drum and provided for each of a plurality of colors. The respective image forming units are arranged along a conveying direction of a recording sheet above a conveyor belt for conveying the recording sheet and transfer toner images of the respective colors to the recording sheet conveyed in the conveying direction in a superimposing manner.

In the image forming apparatus of this type, each image forming unit deflects laser light output from a light source by a scanning lens made using optical resin with good optical properties after reflecting the laser light by a rotational polygon mirror which is driven and rotated, whereby the laser light is scanned across the surface of the photoconductive drum at a constant speed. In this way, an electrostatic latent image is formed on the photoconductive drum surface.

Here, toner images of the respective colors formed on the photoconductive drums by attaching toners to electrostatic latent images need to be transferred in a superimposing manner so as not to cause any position shift on a recording sheet. To this end, a control is executed to adjust write positions (scan positions) of the electrostatic latent images on the surfaces of the photoconductive drums. For example, a control is executed to adjust the operations of the other rotational polygon mirrors so that the rotational polygon mirror in a certain image forming unit and those in the other image forming units rotate with predetermined phase differences.

However, if the temperatures of the respective image forming units differ due to usage frequencies and arranged positions of the respective image forming units, refractive indices of the optical resins forming the scanning lenses may change to be different from each other according to temperature. This may shift laser light paths among the respective image forming units. Even in the case of executing the above control, laser light scan positions may shift among the respective image forming units.

One conventional technology is known which suppresses laser light scan position shifts occurring due to such temperature differences among respective image forming units. According to this conventional technology, when image recording is performed by operating one of a plurality of image forming units, heating means of optical scanning devices in the other image forming units are also operated so that temperature differences of the optical scanning devices in the respective image forming units fall within a predetermined range.

Further, according to another conventional technology, an image of a specific color is formed by rotating a rotational polygon mirror necessary to form the image of the specific color at a rated rotating speed and other rotational polygon mirrors at a rotating speed lower than the rated rotating speed. This enables reductions in noise, vibration, smear of the optical scanning devices and the like while suppressing scan position shifts at the time of image formation.

However, in the case of rotating the rotational polygon mirrors of the other unused optical scanning devices at the rotating speed slower than a predetermined rotating speed suitable for an image forming operation during a single-color image forming operation using only one optical scanning device, the temperature of the one optical scanning device is less likely to decrease since only the rotational polygon mirror of the one optical scanning device is driven and the temperatures of the other unused optical scanning devices increase at a rate slower than the one optical scanning device. As a result, it may take time to sufficiently reduce temperature differences among the respective optical scanning devices.

Further, if the rotational polygon mirror of the one optical scanning device is stopped after the image forming operation is finished, the temperature of the one optical scanning device is likely to decrease. However, when an image forming operation is performed next using that one optical scanning device, it may take time to accelerate the rotating speed of the rotational polygon mirror to a predetermined rotating speed suitable for the image forming operation from a stopped state.

An object of the present disclosure is to suppress scan position shifts which occur due to temperature differences among respective optical scanning devices and enable a next image forming operation to be quickly performed.

SUMMARY

An image forming apparatus according the present disclosure includes a plurality of photoconductors, a plurality of optical scanning devices, a job receiver, a job executor, an image discriminator, a temperature condition judger and a temperature adjuster. The optical scanning devices are arranged in correspondence with the plurality of photoconductors, scan the corresponding photoconductors with laser light and each include a light source for emitting laser light, a rotational polygon mirror for reflecting the laser light output from the light source and scanning the photoconductor, a motor for rotating the rotational polygon mirror, and a temperature detector for detecting temperature of the optical scanning device. The job receiver receives an execution request of an image forming job. The job executor executes the image forming job, the execution request of which has been received by the job receiver. The image discriminator discriminates whether each formation-target image included in the image forming job being executed is a single-color image to be formed using only one of the plurality of optical scanning devices or a multi-color image to be formed using a plurality of ones of the optical scanning devices. The temperature condition judger judges whether or not a largest temperature difference out of temperature differences between temperature detected by the temperature detector of the one optical scanning device used for the formation of the single-color image and temperatures detected by the temperature detectors of unused optical scanning devices, which are the optical scanning devices except the one optical scanning device, out of the plurality of optical scanning devices satisfies a temperature condition of being larger than a predetermined first temperature difference. The temperature adjuster executes a temperature difference reduction process to drive the motor of the one optical scanning device at a second rotating speed slower than a first rotating speed which is a rotating speed during an image forming operation and drive the motors of the unused optical scanning devices at a third rotating speed faster than the second rotating speed if the temperature condition is judged to be satisfied by the temperature condition judger upon the completion of the image forming operation of the single-color image when the formation-target image is discriminated to the single-color image and an image to be formed next is discriminated to the multicolor image by the image discriminator.

These and other objects, features and advantages of the present disclosure will become more apparent upon reading the following detailed description along with the accompanying drawings.

DETAILED DESCRIPTION

Figure 1:
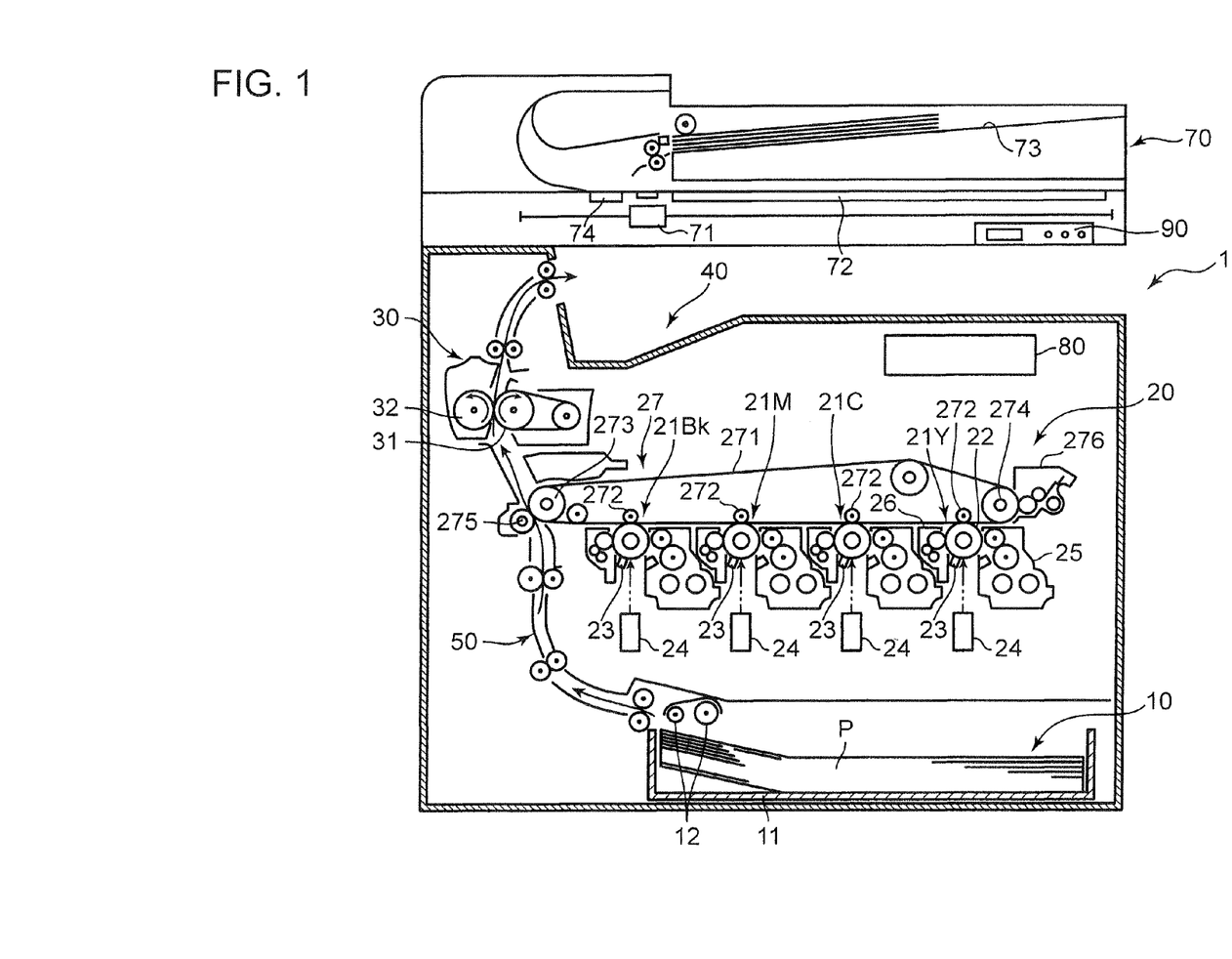
FIG. 1 is a schematic configuration diagram of a complex machine according to one embodiment of an image forming apparatus of the present disclosure.

Hereinafter, an embodiment according to the present disclosure is described based on the drawings. FIG. 1 is a schematic configuration diagram of a complex machine 1 according to one embodiment of an image forming apparatus of the present disclosure.

As shown in FIG. 1, the complex machine 1 includes an image reading unit 70, an operation unit 90, a sheet storage unit 10, an image forming station 20, a fixing unit 30, a sheet discharge unit 40, a sheet conveying unit 50 and a control unit 80.

The image reading unit 70 includes a scanner 71 configured by a CCD (Charge Coupled Device) or the like. The image reading unit 70 reads an image of a document placed on a document platen 72 and generates image data by the scanner 71. Further, the image reading unit 70 successively feeds a plurality of documents stacked on a document placing portion 73 onto a reading window 74 and generates image data by reading images of the documents by the scanner 71 at the position of the reading window 74.

The operation unit 90 includes a touch panel, a numerical keypad and the like and is used by a user to operate functions of the complex machine 1 such as a copy function, a printer function and a scanner function. Specifically, the operation unit 90 outputs an operation instruction (command) and the like to the control unit 80.

The sheet storage unit 10 stores sheets P and picks up a sheet P and feeds it by the control of the control unit 80. The sheet storage unit 10 includes a sheet cassette 11 which is insertable into and withdrawable from the apparatus main body. Pickup rollers 12 for picking up sheets P one by one from a sheet stack are provided on an upstream end of the sheet cassette 11 (left upper side of the sheet cassette 11 in an example shown in FIG. 1). The sheet P picked up from the sheet cassette 11 by driving these pickup rollers 12 is fed to the sheet conveying unit 50.

The image forming station 20 applies an image transfer process to a sheet P under the control of the control unit 80. This transfer process is performed on each sheet P picked up from the sheet stack stored in the sheet storage unit 10 based on image data generated by the image reading unit 70 or image data received by an unillustrated interface circuit from a computer or the like. The interface circuit is connected to an external apparatus such as a computer via a LAN (Local Area Network) or the like and transmits and receives various signals to and from the external apparatus. For example, a network interface (10/100Base-TX) or the like is used as the interface circuit.

The image forming station 20 includes image forming units 21Y, 21C, 21M and 21Bk of respective colors for forming toner images, and a transfer device 27 for transferring toner images formed by these image forming units 21Y, 21C, 21M and 21Bk to a sheet P.

The four image forming units 21Y, 21C, 21M and 21Bk are arranged substantially in a horizontal direction from an upstream side (right side in FIG. 1) to a downstream side. The yellow image forming unit 21Y is arranged on the most upstream side and the cyan image forming unit 21C, the magenta image forming unit 21M and the black image forming unit 21Bk are arranged in this order thereafter. The respective image forming units 21Y, 21C, 21M and 21Bk have a similar configuration and are mounted in the apparatus main body while being positioned to have a predetermined relative positional relationship with the respective devices in the apparatus main body.

Each of the image forming units 21Y, 21C, 21M and 21Bk includes a photoconductive drum (photoconductor) 22, a charger 23, an optical scanning device 24, a developing device 25 and a cleaning device 26. The photoconductive drum 22 is rotatable about a drum shaft extending in forward and backward directions (directions orthogonal to the plane of FIG. 1). The charger 23, the optical scanning device 24, the developing device 25 and the cleaning device 26 are arranged in this order from a position right below the photoconductive drum 22 in a counterclockwise direction, which is a rotating direction of the photoconductive drum 22, along the circumferential surface of the photoconductive drum 22.

The photoconductive drum 22 has the circumferential surface on which an electrostatic latent image and a toner image in conformity with this electrostatic latent image are to be formed.

The charger 23 uniformly charges the circumferential surface of the photoconductive drum 22 rotating counterclockwise about the drum shaft with electric charges. The charger 23 includes a charging roller for applying electric charges to the photoconductive drum 22 while being rotated by having the circumferential surface thereof held in contact with the circumferential surface of the photoconductive drum 22.

The developing device 25 supplies toner to the circumferential surface of the photoconductive drum 22. The toner is attached to an electrostatic latent image on the circumferential surface of the photoconductive drum 22 by the toner supply, whereby a toner image is formed on the circumferential surface of the photoconductive drum 22. Note that yellow (Y) toner is contained in the developing device 25 of the yellow image forming unit 21Y, cyan (C) toner is contained in the developing device 25 of the cyan image forming unit 21C, magenta (M) toner is contained in the developing device 25 of the magenta image forming unit 21M and black (Bk) toner is contained in the developing device 25 of the black image forming unit 21Bk.

The cleaning device 26 performs cleaning by removing the toner remaining on the circumferential surface of the photoconductive drum 22 after primary transfer to be described later. The circumferential surface of the photoconductive drum 22 cleaned by this cleaning device 26 heads for the charger 23 again for the next image forming process.

The optical scanning device 24 irradiates the circumferential surface of the photoconductive drum 22 while being rotated with laser light modulated based on image data. An irradiation position of the laser light is between the charger 23 and the developing device 25. An electrostatic latent image is formed on the circumferential surface of the photoconductive drum 22 by the irradiation of the laser light. The respective optical scanning devices 24 (a plurality of optical scanning devices) in the respective image forming units 21Y, 21C, 21M and 21Bk irradiate laser light corresponding to the respective colors of yellow, cyan, magenta and black to the photoconductive drums 22 in the respective image forming units 21Y, 21C, 21M and 21Bk. When the laser light is irradiated to the uniformly charged circumferential surface of the photoconductive drum 22, electric charges in that irradiated part are erased according to the intensity of the laser light. In this way, the electrostatic latent image is formed on the circumferential surface of the photoconductive drum 22.

Note that the image data are, for example, yellow, cyan, magenta and black image data generated by the image reading unit 70. Alternatively, the image data are yellow, cyan, magenta and black image data received by the unillustrated interface circuit. These image data are image data generated by applying known processings such as a color correction processing to image data generated by the image reading unit 70 or image data input from an external apparatus such as a computer.

The transfer device 27 is a device for transferring the toner images formed on the circumferential surfaces of the photoconductive drums 22 to a sheet P. The transfer device 27 includes an intermediate transfer belt 271, primary transfer rollers 272, a drive roller 273, a driven roller 274 and a secondary transfer roller 275.

The intermediate transfer belt 271 is an endless belt and mounted right above the respective image forming units 21Y, 21C, 21M and 21Bk by a plurality of primary transfer rollers 272, the drive roller 273 and the driven roller 274. The intermediate transfer belt 271 is rotatable clockwise by a rotational drive force of the drive roller 273.

The respective primary transfer rollers 272 are arranged to face the respective photoconductive drums 22 of the respective image forming units 21Y, 21C, 21M and 21Bk. The lift of the intermediate transfer belt 271 from the photoconductive drums 22 is prevented by the respective primary transfer rollers 272 pressing the intermediate transfer belt 271. A primary transfer bias is applied to each primary transfer roller 272. When the primary transfer bias is applied to the primary transfer roller 272, the toner image formed on the circumferential surface of the photoconductive drum 22 is primarily transferred to the intermediate transfer belt 271.

The secondary transfer roller 275 is arranged at a position to face the drive roller 273 on the outer circumferential surface of the intermediate transfer belt 271. A secondary transfer bias is applied to the secondary transfer roller 275. When the secondary transfer bias is applied to the secondary transfer roller 275, the toner images primarily transferred to the intermediate transfer belt 271 are secondarily transferred to a sheet P.

A cleaning device 276 for the intermediate transfer belt is provided at the right side of the driven roller 274 in FIG. 1. The toner remaining on the surface of the intermediate transfer belt 271 after the secondarily transfer of the toner images to the sheet P is removed by this cleaning device 276 for the intermediate transfer belt. The surface of the intermediate transfer belt 271 cleaned in this way heads for the photoconductive drums 22.

The fixing unit 30 applies a fixing process by heating to the sheet P carrying the secondarily transferred toner images under the control of the control unit 80. The fixing unit 30 includes a heat roller 31 in which an electric heating element is mounted and a pressure roller 32 arranged such that the circumferential surface thereof faces that of this heat roller 31. The sheet P after the secondary transfer passes a nip portion between the heat roller 31 that is driven and rotated clockwise about a roller shaft and the pressure roller 32 that rotates counterclockwise about a roller shaft following the rotation of the heat roller 31, whereby the fixing process is applied by obtaining heat from the heat roller 31. The sheet P to which the fixing process was applied is discharged to the sheet discharge unit 40 by the sheet conveying unit 50.

The sheet P to which the fixing process was applied in the fixing unit 30 is discharged to the sheet discharge unit 40, which stores this discharged sheet P.

The sheet conveying unit 50 drives rollers for conveying a sheet under the control of the control unit 80. In this way, the sheet conveying unit 50 conveys a sheet P fed from the sheet storage unit 10 to the sheet discharge unit 40 via the image forming station 20 and the fixing unit 30.

The control unit 80 is connected to the sheet storage unit 10, the image forming station 20, the fixing unit 30, the sheet conveying unit 50, the image reading unit 70, the operation unit 90 and the like and controls the operations of these units. The control unit 80 is, for example, configured by a microcomputer including a CPU (Central Processing Unit), a ROM (Read Only Memory) storing various programs to be executed by the CPU, data necessary for the execution of these programs and the like, a RAM (Random Access Memory) which is a so-called working memory of the CPU, peripheral circuits of the CPU and the like.

An image forming operation in the thus configured complex machine 1 is described. First, after the circumferential surface of the photoconductive drum 22 is uniformly charged by the charger 23, the circumferential surface is exposed to light by the optical scanning device 24. In this way, an electrostatic latent image is formed on the circumferential surface of the photoconductive drum 22. This electrostatic latent image is developed with the toner supplied by the developing device 25. The toner image formed on the surface of the photoconductive drum is transferred onto the intermediate transfer belt 271 by a transfer bias applied to the primary transfer roller 272. The residual toner remaining on the photoconductive drum 22 without being transferred to the intermediate transfer belt 271 is cleaned by the cleaning device 26 and collected into an unillustrated collection bottle. Such exposing, developing and primary transfer operations are successively performed for each of development colors of yellow, cyan, magenta and black. Toner images of the respective colors are superimposed on the surface of the intermediate transfer belt 271 to form a full-color toner image on the intermediate transfer belt 271.

The full-color toner image primarily transferred to the intermediate transfer belt 271 is secondarily transferred to a sheet P timely conveyed from the sheet storage unit 10 to a transfer position by the sheet conveying unit 50 in a secondary transfer portion where the secondary transfer roller 275 and the intermediate transfer belt 271 are in contact. During this secondary transfer, a secondary transfer bias is applied to the secondary transfer roller 275. The full-color toner image transferred to the sheet P is fixed to the sheet P by heating and pressing by the fixing unit 30. Thereafter, this sheet P is discharged to the sheet discharge unit 40. Note that the toner remaining on the intermediate transfer belt 271 is collected by the cleaning device 276 for the intermediate transfer belt for cleaning the surface of the intermediate transfer belt 271 and collected into the unillustrated collection bottle.

Figure 2:
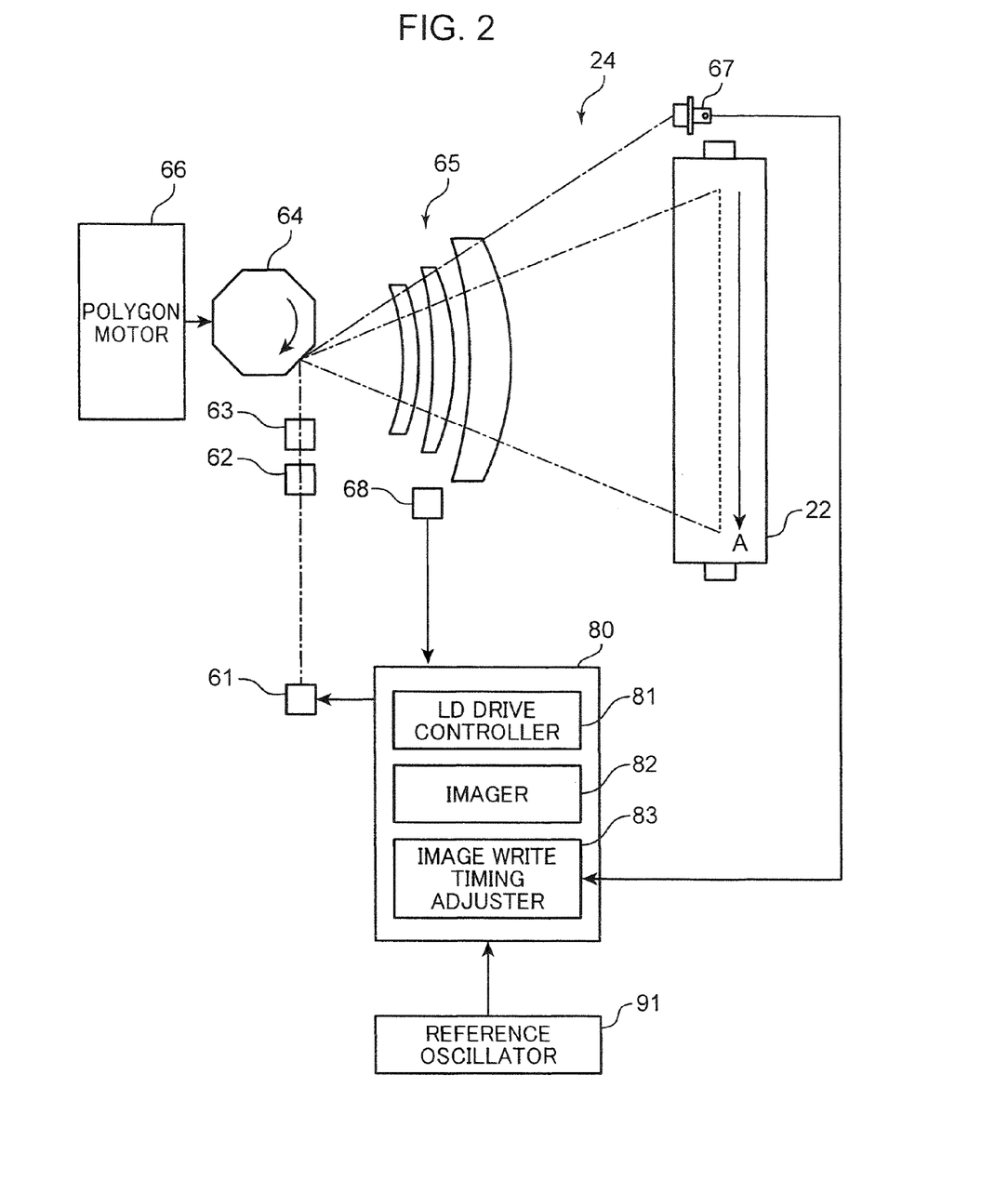
FIG. 2 is a schematic configuration diagram showing the internal configuration of an optical scanning device according to the embodiment.

FIG. 2 is a schematic configuration diagram showing an example of the internal configuration of the optical scanning device 24. Note that since the configurations of the optical scanning devices 24 in the respective image forming units 21Y, 21C, 21M and 21Bk are similar, the following description is made, taking the image forming unit 21Bk as an example.

The optical scanning device 24 includes a laser emitter (light source) 61, a collimator lens 62, a prism 63, a polygon mirror (rotational polygon mirror) 64, an fθ lens 65, a polygon motor (motor) 66, a beam detect sensor (hereinafter, BD (Beam Detect) sensor) 67, and a temperature sensor (temperature detector) 68. Note that the control unit 80 is electrically connected to each optical scanning device 24.

The laser emitter 61 includes a laser light source such as a laser diode (LD) for emitting laser light. Laser light output from the laser light source is converted into parallel light by the collimator lens 62, the prism 63 and the like. This parallel light is reflected toward the polygon mirror 64 by an unillustrated reflecting mirror and incident on the polygon mirror 64 rotated by driving the polygon motor 66.

The polygon mirror 64 includes a plurality of reflecting surfaces for reflecting the laser light output from the laser emitter 61 toward the photoconductive drum 22 and scanning the circumferential surface of the photoconductive drum 22 with this laser light (for example, there are eight reflecting surfaces in FIG. 2). The polygon mirror 64 is driven and rotated, for example, in an arrow direction of FIG. 2 at a constant speed by the polygon motor 66, whereby the laser light emitted from the laser emitter 61 is reflected by the respective reflecting surfaces of the polygon mirror 64.

The fθ lens 65 (optical lens made of resin) is formed by, for example, mold-forming optical resin with good optical properties. The fθ lens 65 condenses the laser light reflected by the polygon mirror 64 and focuses it on the circumferential surface of the photoconductive drum 22. By this laser light, the circumferential surface of the photoconductive drum 22 is scanned at a constant speed in a rotary axis direction (main scanning direction, direction of arrow A of FIG. 2) to erase electric charges on the circumferential surface of the photoconductive drum 22. In this way, an electrostatic latent image is formed on the circumferential surface of the photoconductive drum 22.

The BD sensor 67 includes, for example, a photodiode and used to adjust a timing at which beam scanning (hereinafter, referred to as an image writing operation) for forming a toner image (electrostatic latent image) is performed on the photoconductive drum 22. When the laser light reflected by the polygon mirror 64 rotating in the arrow direction shown in FIG. 2 is incident on the BD sensor 67 through the fθ lens 65, a detection signal is output from the BD sensor 67. The detection signal of the BD sensor 67 is input to an image write timing adjuster 83 to be described later and used to adjust an image write timing of the laser light for scanning the circumferential surface of the photoconductive drum 22.

The temperature sensor 68 detects the temperature of the corresponding optical scanning device 24. Specifically, the temperature sensor 68 is arranged outside a laser light path and within a predetermined short distance from the fθ lens 65 in a housing forming an outer body of the optical scanning device 24. The temperature sensor 68 detects temperature near the fθ lens 65 and outputs a detection signal indicating this detected temperature to the control unit 80.

A refractive index of the fθ lens 65 is changed by temperature near the vicinity of the fθ lens 65. Thus, if there are differences between temperatures near the fθ lenses 65 among the respective optical scanning devices 24, refractive indices of the fθ lenses 65 are made different among the respective optical scanning devices 24 by this. Thus, a moving speed of the laser light in the main scanning direction (main scanning magnification) may change among the respective optical scanning devices 24. Therefore, as described later, the respective optical scanning devices 24 are temperature-controlled by the control unit 80 to reduce differences between the temperatures near the fθ lenses 65 among the respective optical scanning devices 24. The detection signal of the temperature sensor 68 is used for the temperature control of each optical scanning device 24.

The complex machine 1 includes a reference oscillator 91 for generating a reference clock signal. The control unit 80 obtains an operation timing by the reference clock signal output from the reference oscillator 91. The control unit 80 adjusts an image write timing in accordance with the operation timing in controlling the drive of the laser emitter 61 based on image data of an image to be written.

The control unit 80 functions particularly as an LD drive controller 81, an imager 82 and the image write timing adjuster 83 to control laser light scanning by the optical scanning device 24.

The LD drive controller 81 controls the drive of the laser emitter 61 based on an instruction from the imager 82. The imager 82 starts the drive of the LD drive controller 81 based on image data of an image to be written. The image write timing adjuster 83 adjusts an image write timing, at which the laser light is scanned across the surface of the photoconductive drum 22, based on a BD signal output from the BD sensor 67 and outputs it to the imager 82.

Figure 3:
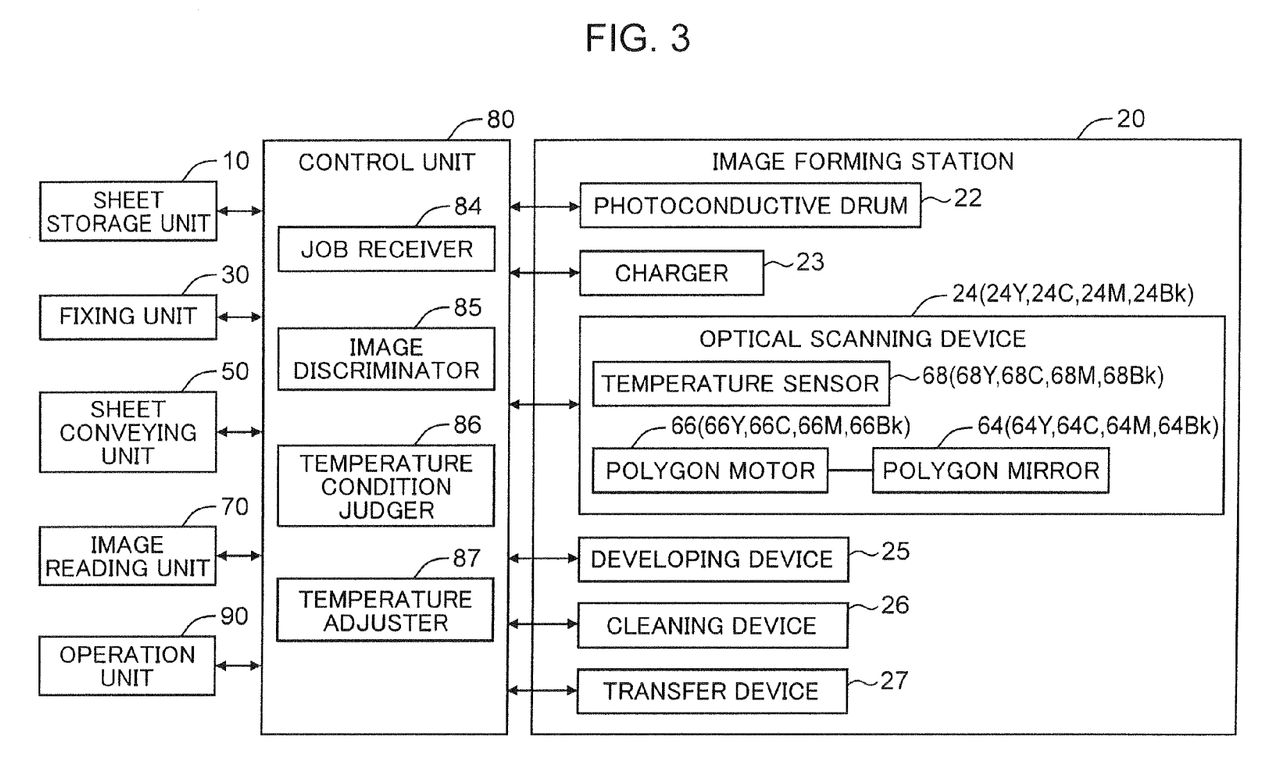
FIG. 3 is a block diagram showing the electrical configuration of the complex machine.

FIG. 3 is a block diagram showing an example of the electric configuration of the complex machine 1. Note that, in the following description, the optical scanning devices 24 of the respective colors of yellow Y, cyan C, magenta M and black Bk are respectively denoted by "24Y", "24C", "24M" and "24Bk". Further, the polygon mirrors 64 of the optical scanning devices 24Y, 24C, 24M and 24Bk of the respective colors of yellow Y, cyan C, magenta M and black Bk are respectively denoted by "64Y", "64C", "64M" and "64Bk". Further, the polygon motors 66 of the optical scanning devices 24Y, 24C, 24M and 24Bk of the respective colors of yellow Y, cyan C, magenta M and black Bk are respectively denoted by "66Y", "66C", "66M" and "66Bk". Furthermore, the temperature sensors 68 of the optical scanning devices 24Y, 24C, 24M and 24Bk of the respective colors of yellow Y, cyan C, magenta M and black Bk are respectively denoted by "68Y", "68C", "68M" and "68Bk".

The control unit 80 functions to particularly include a job receiver 84, an image discriminator 85, a temperature condition judger 86 and a temperature adjuster 87 in association with the temperature control of the optical scanning devices 24Y, 24C, 24M and 24Bk of the respective colors of yellow Y, cyan C, magenta M and black Bk.

The job receiver 84 receives an execution request of an image forming job. For example, the job receiver 84 receives an execution request of an image forming job through the operation of the operation unit 90 by the user. Specifically, the job receiver 84 causes the image reading unit 70 to read an image of a document in accordance with an instruction input by the operation of the operation unit 90 and receives generated image data. Further, the job receiver 84 receives information indicating image forming conditions input by the operation of the operation unit 90. The information indicating the image forming conditions includes information indicating an instruction as to whether a formation-target image indicated by the received image data is to be formed as a monochrome image (single-color image) or as a color image (multi-color image), information indicating the number of sets of copies to be made at the time of image formation, and the like.

In this way, the image forming job is configured to include image data indicating formation-target images and information indicating image forming conditions. For example, information indicating image forming conditions includes information indicating an instruction as to whether a formation-target image is to be formed as a monochrome image or as a color image and the like. Here, a monochrome image is an image formed using any one of the plurality of optical scanning devices 24. A color image is an image using a plurality of optical scanning devices 24.

Note that information indicating an instruction to form a monochrome image includes information indicating the use of the optical scanning device 24 of which one of yellow Y, cyan C, magenta M and black Bk to form this monochrome image. Information indicating an instruction to form a color image includes information indicating the use of the optical scanning devices 24 of which ones of yellow Y, cyan C, magenta M and black Bk to form this color image.

Without being limited to this, the job receiver 84 may be configured to receive an execution request of an image forming job, such as by receiving image data and information indicating image forming conditions of the image data via the interface circuit from an external apparatus such as a computer.

The image discriminator 85 discriminates whether each formation-target image included in an image forming job being executed is a monochrome image or a color image based on information included in the image forming job and indicating image forming conditions.

The temperature condition judger 86 judges whether or not a largest temperature difference out of temperature differences between temperature detected by the temperature sensor of the optical scanning device 24 of any one color used for image formation of a monochrome image out of yellow Y, cyan C, magenta M and black Bk and temperatures detected by the temperature sensors 68 of the optical scanning devices 24 except the optical scanning device 24 of that one color satisfies a temperature condition of being larger than a predetermined first temperature difference when the formation-target image is discriminated to a monochrome image by the image discriminator 85. The optical scanning devices 24 except the optical scanning device of the one color used for image formation are referred to as unused optical scanning devices below.

For example, if the optical scanning device 24 used for image formation is of black Bk, the temperature condition judger compares temperature detected by the temperature sensor 68Bk and those detected by the temperature sensors 68Y, 68C and 68M of yellow Y, cyan C and magenta M and specifies the largest temperature difference. For example, if the temperature difference from the temperature detected by the temperature sensor 68M of magenta M is largest, the temperature condition judger 86 judges whether or not the temperature difference between the detected temperature by the temperature sensor 68Bk and that by the temperature sensor 68M satisfies the temperature condition. Note that the first temperature difference is determined in advance based on an experimental value such as one obtained in trial operation, and stored in the ROM.

The temperature adjuster 87 performs a temperature difference reduction process if the temperature condition is judged to be satisfied by the temperature condition judger 86 upon the completion of the image formation operation of the monochrome image when the formation-target image is discriminated to be a monochrome image and the next formation-target image is discriminated to be a color image by the image discriminator 85. This temperature difference reduction process is a drive process for driving the polygon motor 66 of one optical scanning device 24 used for the image formation of the monochrome image at a second rotating speed V2 slower than a first rotating speed V1 predetermined as a rotating speed at the time of the image forming operation and driving the polygon motors 66 of the unused optical scanning devices at a third rotating speed V3 faster than the second rotating speed.

Note that the first rotating speed V1 is determined to be a rotating speed suitable for scanning the photoconductive drum 22 substantially at a constant speed with laser light reflected by the polygon motor 64, for example, based on an experimental value such as one obtained in trial operation, and stored in the ROM. The second rotating speed V2 is determined to be a rotating speed slower than the first rotating speed V1 and stored in the ROM. The third rotating speed V3 is determined to be a rotating speed slower than the second rotating speed V2 and stored in the ROM.

The temperature adjuster 87 starts the image forming operation of a color image, which is the next formation-target image, when the largest temperature difference between the temperature detected by the temperature sensor 68 of the one optical scanning device 24 used for monochrome image formation and the temperatures detected by the temperature sensors 68 of the unused optical scanning devices becomes smaller than a second temperature difference smaller than the first temperature difference during the execution of the temperature difference reduction process.

For example, if the optical scanning device 24 used for monochrome image formation is of black Bk, the temperature adjuster 87 compares the temperature detected by the temperature sensor 68Bk and those detected by the temperature sensors 68Y, 68C and 68M of yellow Y, cyan C and magenta M and specifies the largest temperature difference during the execution of the temperature difference reduction process. For example, if the temperature difference from the temperature detected by the temperature sensor 68Y of yellow Y is largest, the temperature adjuster 87 judges whether or not the temperature difference between the detected temperature by the temperature sensor 68Bk and that by the temperature sensor 68Y is smaller than the second temperature difference. When this temperature difference becomes smaller than the second temperature difference, the temperature adjuster 87 starts the image forming operation of the color image which is the next formation-target image. Note that the second temperature difference is determined to be smaller than the first temperature difference based on an experimental value such as one obtained in trial operation, and stored in the ROM.

Figure 4:
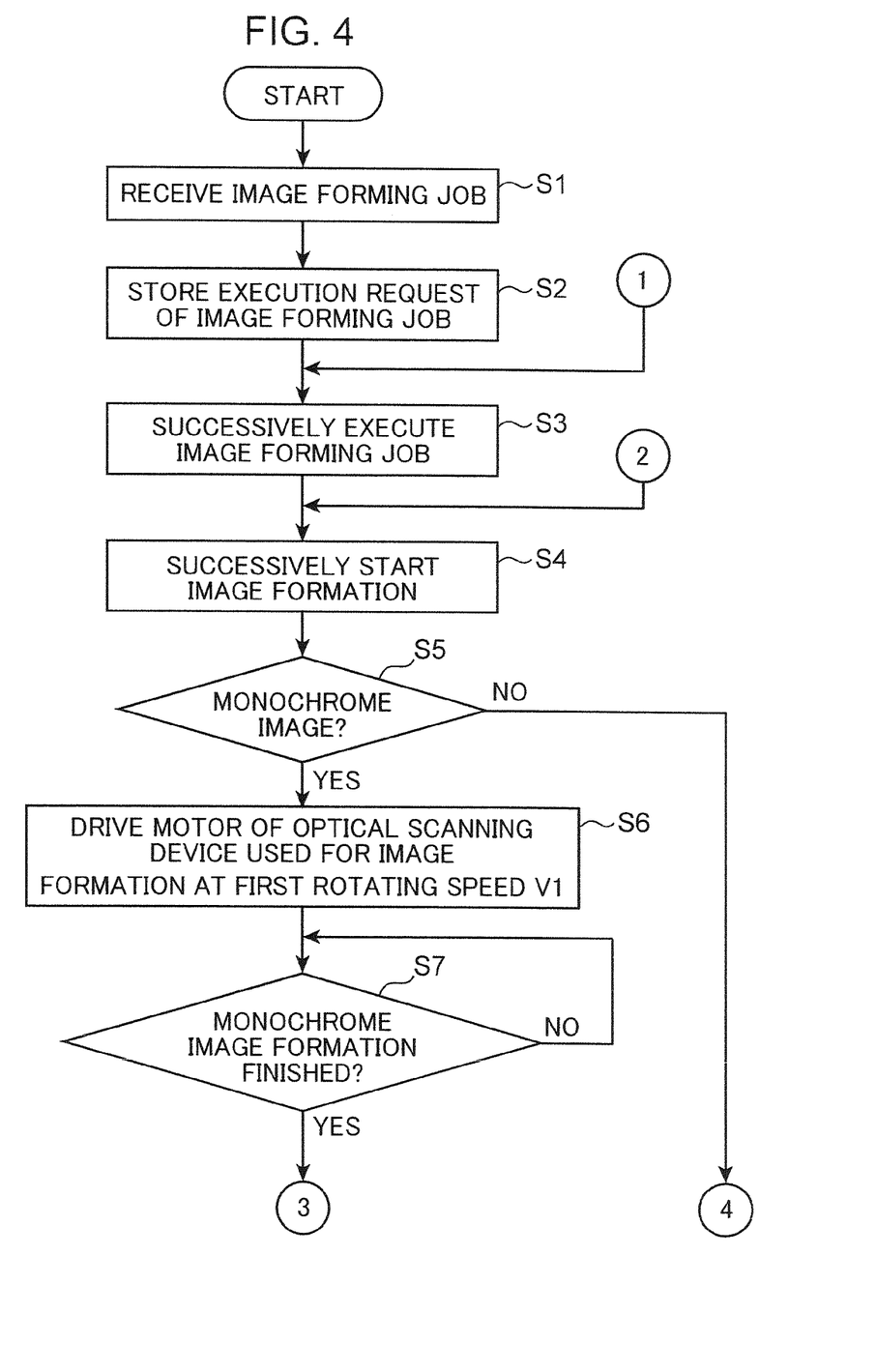
FIG. 4 is a flow chart showing a first half of a temperature control operation of respective optical scanning devices.
Figure 5:
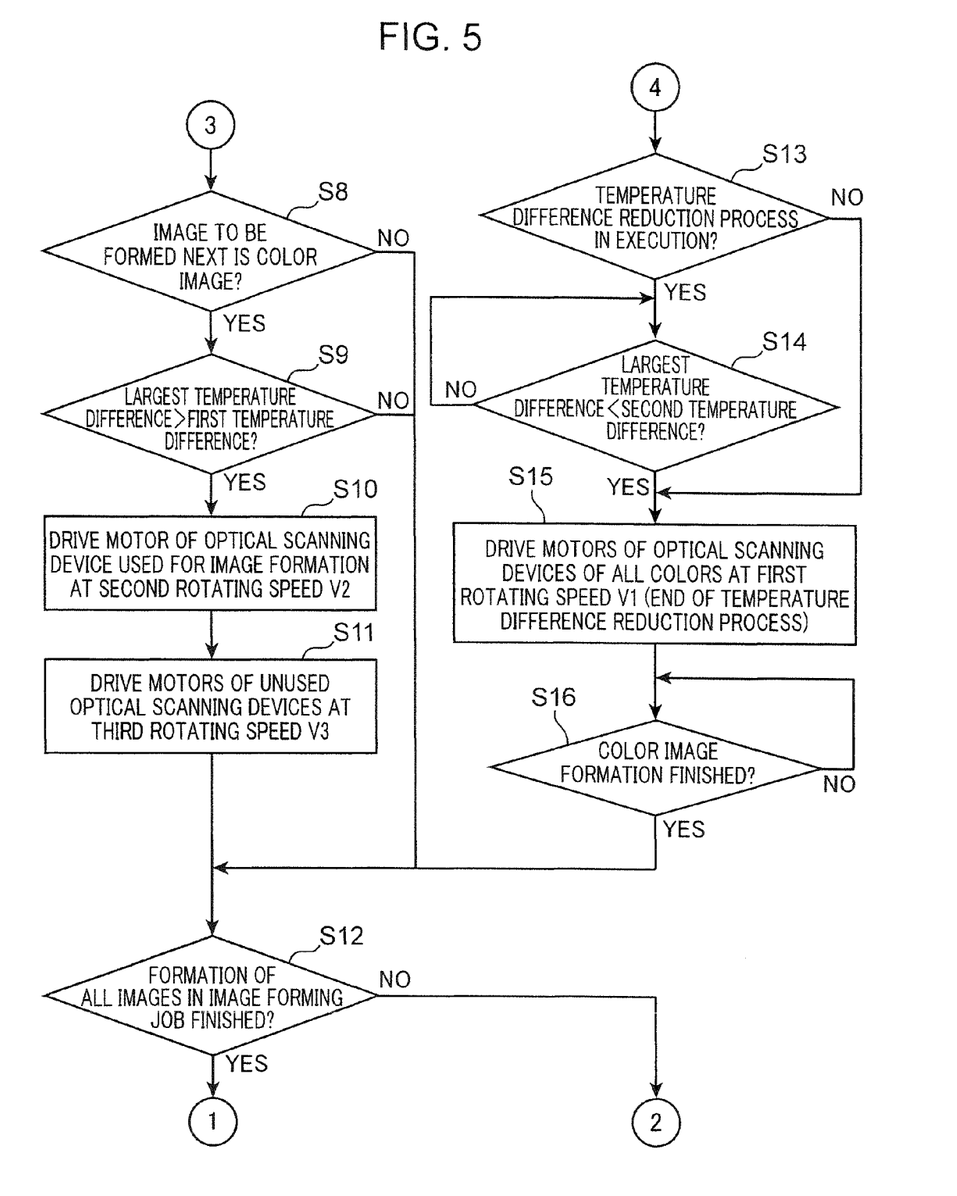
FIG. 5 is a flow chart showing a second half of the temperature control operation of the respective optical scanning devices.
Figure 6:
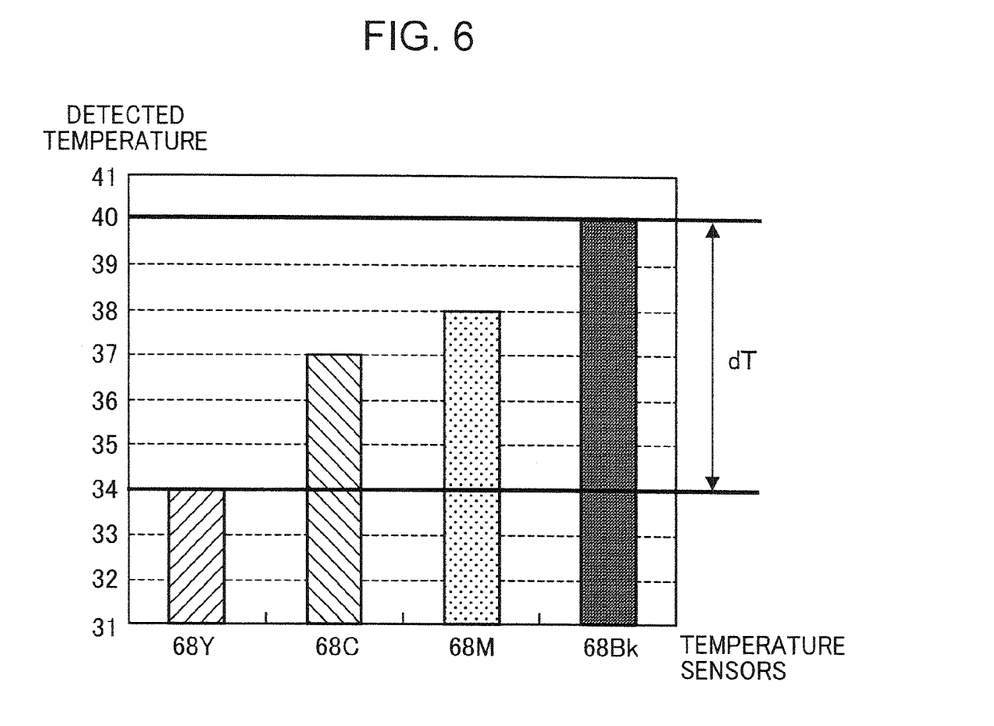
FIG. 6 is a graph showing an example of temperatures detected by respective temperature detectors.
Figure 7:
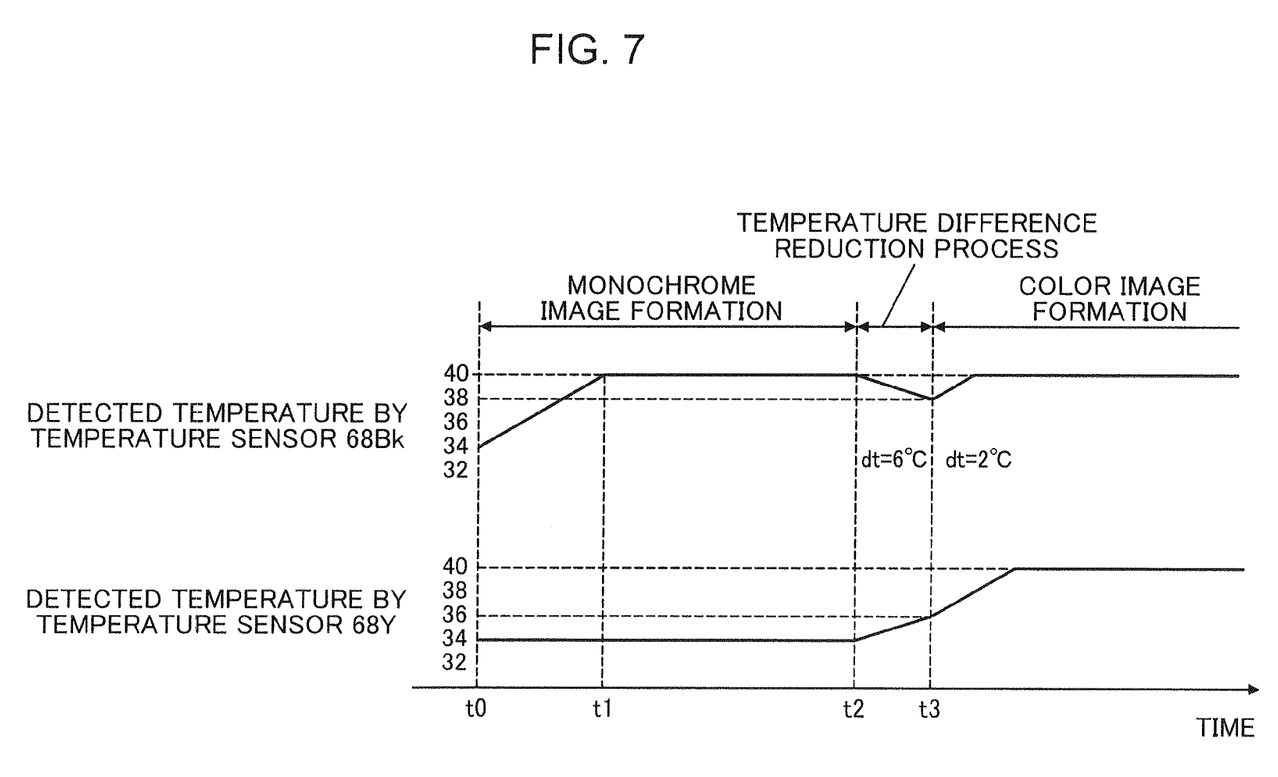
FIG. 7 is a graph showing an example of time series variations of temperatures near fθ lenses of black and yellow optical scanning devices.

A temperature control operation of the optical scanning devices 24Y, 24C, 24M and 24Bk of the respective colors of yellow Y, cyan C, magenta M and black Bk is described below using FIGS. 4 to 7. FIGS. 4 and 5 are flow charts showing an example of the temperature control operation of the optical scanning devices 24Y, 24C, 24M and 24Bk of the respective colors of yellow Y, cyan C, magenta M and black Bk. FIG. 6 is a graph showing an example of temperatures near the fθ lenses 65 of the optical scanning devices 24Y, 24C, 24M and 24Bk of the respective colors of yellow Y, cyan C, magenta M and black Bk detected by the respective temperature sensors 68Y, 68C, 68M and 68Bk. FIG. 7 is a graph showing an example of time series variations of the temperatures near the fθ lenses 65 of the optical scanning devices 24Bk, 24Y of black Bk, yellow Y detected by the temperature sensors 68Bk, 68Y.

In the following description, an image forming operation using the optical scanning device 24Bk of black Bk is performed during monochrome image formation as a specific example. In accordance with this, the unused optical scanning devices are the optical scanning devices 24Y, 24C and 24M of yellow Y, cyan C and magenta M.

When receiving an execution request of an image forming job (S1), the job receiver 84 stores the execution request of the image forming job received in Step S1 in the RAM (S2). The control unit 80 (job executor) successively reads the execution requests of the image forming jobs stored in the RAM and executes the image forming job corresponding to the read execution request (S3). To execute an image forming job means that the control unit causes the image forming station 20 to form (transfer to a sheet) a formation-target image indicated by image data included in the image forming job based on information indicating image forming conditions included in the image forming job. The job receiver 84 executes Steps S1 and S2 in parallel to processings after Step S3.

The control unit 80 successively starts forming unformed formation-target images included in the image forming job being executed (S4). Then, the image discriminator 85 discriminates whether or not the formation-target image is a monochrome image based on the information indicating the image forming conditions included in the image forming job being executed (S5).

If the formation-target image is discriminated to be a monochrome image by the image discriminator 85 in Step S5 (S5; YES), the control unit 80 starts forming the formation-target monochrome image using the optical scanning device 24Bk of black Bk by driving the polygon motor 66Bk at the predetermined first rotating speed V1 (S6). Thereafter, laser light output at a predetermined timing by the drive control of the laser emitter 61 by the control unit 80 is reflected (deflected) toward the surface of the photoconductive drum 22 by the polygon mirror 64Bk driven and rotated by the polygon motor 66Bk. Note that the first rotating speed V1 is set at a rotating speed suitable to scan the photoconductive drum 22 substantially at a constant speed with the laser light reflected (deflected) by the polygon motor 64Bk based on an experimental value such as one obtained in trial operation.

If the image forming operation of the formation-target monochrome image being executed is finished (S7; YES), the temperature adjuster 87 judges whether or not the next formation-target image included in the image forming job being executed is a color image based on the information indicating the image forming conditions included in the image forming job being executed (S8).

Here, the monochrome image forming operation means an operation from the start to the end of the output of the laser light representing the formation-target image by the optical scanning device 24Bk of black Bk. Alternatively, the monochrome image forming operation may mean the start of the output of the laser light representing the formation-target image to the discharge of a sheet having the image formed to the sheet discharge unit 40 by the sheet conveying unit 50.

If the monochrome image started to be formed in Step S6 by the control unit 80 is an image to be formed last out of the formation-target images included in the image forming job, the temperature adjuster 87 judges whether or not an image to be formed first out of formation-target images included in an image forming job stored in the RAM and to be executed next is a color image in Step S8.

If the image to be formed next is judged to be a color image by the temperature adjuster 87 in Step S8 (S8; YES), the temperature condition judger 86 causes the respective temperature sensors 68Y, 68C, 68M and 68Bk to detect the temperatures near the fθ lenses 65 of the optical scanning devices 24Y, 24C, 24M and 24Bk of the respective colors. Then, the temperature condition judger calculates each of temperature differences between the temperature detected by the temperature sensor 68Bk of the optical scanning device 24Bk of black Bk and the temperatures detected by the temperature sensors 68Y, 68C and 68M of the unused optical scanning devices 24Y, 24C and 24M. Further, the temperature condition judger 86 judges whether or not the largest temperature difference out of these temperature differences satisfies the temperature condition of being larger than the first temperature difference (S9).

In a specific example described below, it is assumed in Step S9 that the temperatures near the fθ lenses 65 of the optical scanning devices 24Y, 24C, 24M and 24Bk of the respective colors detected by the respective temperature sensors 68Y, 68C, 68M and 68Bk are respectively 34° C., 37° C., 38° C. and 40° C., for example, as shown in FIG. 6.

In Step S9, the temperature condition judger 86 judges whether or not the largest temperature difference out of the temperature differences between the temperature detected by the temperature sensor 68Bk of the optical scanning device 24Bk of black Bk used for image formation and the temperatures detected by the temperature sensors 68 of the unused optical scanning devices 24Y, 24C, 24M and 24Bk, i.e. a temperature difference dT (6° C.) between the temperature detected by the optical scanning device 24Bk of black Bk (40° C.) and the temperature detected by the optical scanning device 24Y of yellow Y (34° C.) satisfies the temperature condition of being larger than the first temperature difference.

Here, the first temperature difference is, for example, set at 5° C. In this case, the largest temperature difference dT (6° C.) out of the temperature differences between the temperature detected by the temperature sensor 68Bk of the optical scanning device 24Bk of black Bk used for image formation and the temperatures detected by the temperature sensors 68Y, 68C and 68M of the unused optical scanning devices 24Y, 24C and 24M is larger than the first temperature difference (5° C.). Thus, the temperature condition judger 86 judges that the temperature condition is satisfied (S9; YES).

If the temperature condition is judged to be satisfied by the temperature condition judger 86 (S9; YES), the temperature adjuster 87 executes the temperature difference reduction process. By this, the temperature adjuster 87 drives the polygon motor 66Bk of the optical scanning device 24Bk of black Bk used for monochrome image formation at the second rotating speed V2 slower than the first rotating speed V1 (S10) and drives the polygon motors 66Y, 66C and 66M of the unused optical scanning devices 24Y, 24C and 24M at the third rotating speed V3 faster than the second rotating speed V2 (S11). Further, the temperature adjuster stores information indicating the ongoing temperature difference reduction process in the RAM.

A transition is made to Step S12 if the next formation-target image is judged not to be a color image by the temperature adjuster 87 in Step S8 (S8; NO), if the temperature condition is judged not to be satisfied by the temperature adjuster 87 in Step S9 (S9; NO) and if Step S11 is executed.

If there is any unformed image out of formation-target images included in the image forming job being executed (S12; NO), the control unit 80 returns to Step S4 and starts forming the unformed formation-target image included in the image forming job being executed. On the other hand, if the formation of all the formation-target images included in the image forming job being executed is finished (S12; YES), the control unit 80 returns to Step S3, successively read execution requests of unexecuted image forming jobs stored in the RAM and executes the image forming job corresponding to the read execution request.

If the formation-target image is discriminated not to be a monochrome image by the image discriminator 85 in Step S5 (S5; NO), the temperature adjuster 87 judges whether or not the temperature difference reduction process is in execution based on whether or not information indicating the ongoing temperature difference reduction process is stored in the RAM (S13).

If it is judged that the temperature difference reduction process is in execution (S13; YES), the temperature adjuster 87 causes the respective temperature sensors 68Y, 68C, 68M and 68Bk to detect the temperatures near the fθ lenses 65 of the optical scanning devices 24Y, 24C, 24M and 24Bk of the respective colors and judges whether or not the largest temperature difference out of the temperature differences between the temperature detected by the temperature sensor 68Bk of the optical scanning device 24Bk of black Bk and the temperatures detected by the temperature sensors 68Y, 68C and 68M of the unused optical scanning devices 24 is smaller than the second temperature difference (e.g. 2° C.) smaller than the first temperature difference (5° C.) (S14).

If the largest temperature difference out of the temperature differences between the temperature detected by the temperature sensor 68Bk of the optical scanning device 24Bk of black Bk and the temperatures detected by the temperature sensors 68Y, 68C and 68M of the unused optical scanning devices 24 is judged to be smaller than the second temperature difference (e.g. 2° C.) smaller than the first temperature difference (5° C.) in Step S14 (S14; YES), the temperature adjuster 87 causes the control unit 80 to start the image forming operation of the formation-target color image by driving the polygon motors 66Y, 66M, 66C and 66Bk of the optical scanning devices 24Y, 24M, 24C and 24Bk of all the colors at the first rotating speed V1. By this, the temperature adjuster 87 finishes the temperature difference reduction process and deletes the information indicating the ongoing temperature difference reduction process from the RAM (S15).

Further, if it is judged that the temperature difference reduction process is not in execution in Step S13 (S13; NO), the temperature adjuster 87 causes the control unit 80 to start the image forming operation of the formation-target color image by driving the polygon motors 66Y, 66M, 66C and 66Bk of the optical scanning devices 24Y, 24M, 24C and 24Bk of all the colors at the first rotating speed V1 (S15).

If the image forming operation of the formation-target color image being executed is finished (S16; YES), a transition is made to Step S12. If there is any unformed image out of formation-target images included in the image forming job (S12; NO), the control unit 80 returns to Step S4 and starts forming the unformed formation-target image included in the image forming job being executed. On the other hand, if the formation of all the formation-target images included in the image forming job being executed is finished (S12; YES), the control unit 80 returns to Step S3, successively read execution requests of unexecuted image forming jobs stored in the RAM and executes the image forming job corresponding to the read execution request.

Time series variations of the respective temperatures of the optical scanning device 24Bk of black Bk and the optical scanning device 24Y of yellow Y are described below, assuming that the optical scanning device 24Y of yellow Y out of the unused optical scanning devices 24Y, 24C and 24M has a largest temperature difference from the optical scanning device 24Bk of black Bk.

As shown in FIG. 7, Step S6 is executed by the control unit 80 at time t0, whereby the polygon motor 66Bk of the optical scanning device 24Bk of black Bk is driven at the first rotating speed V1. In this way, the temperature detected by the temperature sensor 68Bk gradually increases from 34° C. and is stabilized at 40° C. after a while (after t1). On the other hand, since no image forming operation is performed in the unused optical scanning devices 24Y, 24C and 24M, the temperature detected by the temperature sensor 68Y of the optical scanning device 24Y is kept and stabilized at 34° C.

Thereafter, when the monochrome image forming operation is finished at time t2 (S7; YES) and an image to be formed next is judged to be a color image by the temperature adjuster 87 (S8; YES), the temperature difference is larger than the first temperature difference (5° C.) since the temperature detected by the temperature sensor 68Bk is 40° C. and that detected by the temperature sensor 68Y is 34° C. Thus, the temperature condition judger 86 judges that the temperature condition is satisfied at time t2 (S9; YES) and the temperature adjuster 87 executes the temperature difference reduction process based on this judgment result (Steps S10 and S11).

Since the polygon motor 66*bk* of the optical scanning device 24Bk of black Bk is driven at the second rotating speed V2 slower than the first rotating speed V1 after t2 in Step S10, the temperature detected by the temperature sensor 68Bk gradually decreases from 40° C. at time t2. Further, since the polygon motor 66Y of the optical scanning device 24Y of yellow Y is driven at the third rotating speed V3 faster than the second rotating speed V2 after t2 in Step S11, the temperature detected by the temperature sensor 68Y gradually increases after time t2.

When time t3 is reached during the execution of the temperature difference reduction process, the temperature adjuster judges that the temperature difference is smaller than the second temperature difference (e.g. 2° C.) smaller than the first temperature difference (5° C.) since the temperature detected by the temperature sensor 68Bk becomes 38° C. and the temperature detected by the temperature sensor 68Y exceeds 36° C. (S14; YES). In this case, the temperature adjuster 87 finishes the temperature difference reduction process since the temperature differences among the respective optical scanning devices are reduced and scan position shifts are less likely to occur among the respective optical scanning devices, and causes the control unit 80 to start the color image forming operation (S15).

According to this embodiment, the temperature adjuster executes the temperature difference reduction process if the temperature condition is judged to be satisfied by the temperature condition judger 86 (S9; YES) upon the completion of the monochrome image forming operation (S5; YES and S7; YES and S8; YES) when a formation-target image is discriminated to be a monochrome image and an image to be formed next is discriminated to be a color image by the image discriminator 85. By this, the temperature adjuster 87 drives the polygon motor 66Bk of the optical scanning device 24Bk of black Bk used for image formation at the second rotating speed V2 slower than the first rotating speed V1 (S10) and drives the polygon motors 66Y, 66C and 66M of the unused optical scanning devices 24Y, 24C and 24M at the third rotating speed V3 faster than the second rotating speed V2 (S11).

Accordingly, the temperature differences among the respective optical scanning devices can be quickly reduced by increasing temperature increase rates of the unused optical scanning devices 24Y, 24C and 24M not used for monochrome image forming operation while making a temperature increase rate of the optical scanning device 24Bk of black Bk used for this image forming operation smaller than during the image forming operation. This can suppress scan position shifts which occur due to temperature differences among the respective optical scanning devices during the next image forming operation.

Further, the temperature adjuster 87 drives the polygon motor 66Bk of the optical scanning device 24Bk of black Bk used for image formation at the second rotating speed V2 when the monochrome image forming operation is finished. Thus, a time required to accelerate the polygon motor 66Bk up to the first rotating speed V1 when the image forming operation is performed next using the optical scanning device 24Bk can be shortened as compared with the case where the motor of the one optical scanning device used for image formation is stopped when the monochrome image forming operation is finished. This enables the next image forming operation to be quickly performed.

If the temperature difference reduction process is continued even after the temperature differences among the respective optical scanning devices become smaller than the second temperature difference during the execution of the temperature difference reduction process (S13; YES and S14; YES), the temperatures of the unused optical scanning devices 24Y, 24M and 24C are increased more than necessary. As a result, the temperatures of the unused optical scanning devices 24Y, 24M and 24C may become higher than the temperature of the optical scanning device 24Bk of black Bk used for the image forming operation and the temperature differences among the respective optical scanning devices may be reduced more than necessary. However, according to the above embodiment, the temperature adjuster 87 finishes the temperature difference reduction process (S15) and causes the control unit 80 to start the color image forming operation if the temperature differences among the respective optical scanning devices become smaller than the second temperature difference during the execution of the temperature difference reduction process (S14; YES). Thus, it can be avoided that temperature differences among the optical scanning devices 24 become smaller than necessary.

Note that, in the above embodiment, the temperature sensor 68 is disposed outside the laser light path and within the predetermined short distance from the fθ lens 65. However, the disposed position of the temperature sensor 68 is not limited to that in the above embodiment.

For example, the temperature sensor 68 may be disposed in contact with an end part of the fθ lens 65 and, thereby, may detect the temperature of the fθ lens 65 itself. Alternatively, the temperature sensor 68 may be arranged at a position as close to the fθ lens 65 as possible in the housing of the optical scanning device 24 if there is no space to dispose the temperature sensor 68 near the fθ lens 65.

The closer to the fθ lens 65 the temperature sensor 68 is arranged, the more accurately the temperature of the fθ lens 65 can be detected. This enables differences in the refractive index of the fθ lens 65 among the respective optical scanning devices 24 to be accurately reduced by accurately reducing differences in the temperature near the fθ lens 65 among the respective optical scanning devices 24 by the above temperature control.

Note that the present disclosure can be modified in various manners without being limited to the configuration of the above embodiment. The configurations and processes shown in FIGS. 1 to 7 are merely illustration of the embodiment according to the present disclosure and not of the nature to limit the present disclosure to the above embodiment. For example, a modification simplified by not executing Steps S13 and S14 (FIG. 5) may be adopted.

Further, in the above embodiment, the complex machine 1 has been described as an example of the image forming apparatus according to the present disclosure. The present disclosure can also be applied to copiers, facsimile machines and color printers which are capable of color printing. Further, although the tandem color complex machine 1 in which the image forming units 21Y, 21C, 21M and 21Bk are arranged substantially in the horizontal direction has been described as an example in the above embodiment, another printing method may be adopted if the image forming apparatus is of a type including a plurality of optical scanning devices for scanning a photoconductor with laser light.

According to the present disclosure as described above, it is possible to provide an image forming apparatus capable of suppressing scan position shifts occurring due to temperature differences among respective optical scanning devices and quickly performing a next image forming operation.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image forming apparatus including a plurality of optical scanning devices arranged in correspondence with a plurality of photoconductors, configured to scan the corresponding photoconductors with laser light, comprising:
    an optical scanning device including
        a light source for emitting laser light,
        a rotational polygon mirror for reflecting the laser light output from the light source and scanning the photoconductor,
        a motor for rotating the rotational polygon mirror, and
        a temperature detector for detecting temperature of the optical scanning device;
    a job receiver for receiving an execution request of an image forming job;
    a job executor for executing the image forming job, the execution request of which has been received by the job receiver;
    an image discriminator for discriminating whether each formation-target image included in the image forming job being executed is a single-color image to be formed using only one of the plurality of optical scanning devices or a multi-color image to be formed using a plurality of ones of the optical scanning devices;
    a temperature condition judger for judging whether or not a largest temperature difference out of temperature differences between temperature detected by the temperature detector of the one optical scanning device used for the formation of the single-color image and temperatures detected by the temperature detectors of unused optical scanning devices, which are the optical scanning devices except the one optical scanning device, out of the plurality of optical scanning devices satisfies a temperature condition of being larger than a predetermined first temperature difference; and a temperature adjuster for executing a temperature difference reduction process to drive the motor of the one optical scanning device at a second rotating speed slower than a first rotating speed which is a rotating speed during an image forming operation and drive the motors of the unused optical scanning devices at a third rotating speed faster than the second rotating speed if the temperature condition is judged to be satisfied by the temperature condition judger upon the completion of the image forming operation of the single-color image when the formation-target image is discriminated to the single-color image and an image to be formed next is discriminated to the multi-color image by the image discriminator.

2. An image forming apparatus according to claim 1, wherein:

the temperature condition judger finishes the temperature difference reduction process and starts the image forming operation of the multi-color image which is the image to be formed next when the largest temperature difference out of the temperature differences between the temperature detected by the temperature detector of the one optical scanning device and the temperatures detected by the temperature detectors of the unused optical scanning devices becomes smaller than a second temperature difference smaller than the first temperature difference.

3. An image forming apparatus according to claim 1, wherein:

the optical scanning device includes an optical lens made of resin and configured to focus the laser light on a surface of the photoconductor; and the temperature detector detects the temperature of the optical lens or temperature near the optical lens.

4. An image forming apparatus according to claim 3, wherein:

the optical lens is an fθ lens.

* * * * *